United States Patent
Feng et al.

(10) Patent No.: US 8,817,354 B2
(45) Date of Patent: Aug. 26, 2014

(54) OPTICAL DEVICE HAVING REDUCED OPTICAL LEAKAGE

(75) Inventors: Dazeng Feng, El Monte, CA (US); Mehdi Asghari, Pasadena, CA (US); Cheng-Chih Kung, San Gabriel, CA (US)

(73) Assignee: Kotura, Inc., Monterey Park, CA (US)

( * ) Notice: Subject to any disclaimer, the term of this patent is extended or adjusted under 35 U.S.C. 154(b) by 225 days.

(21) Appl. No.: 13/374,784

(22) Filed: Jan. 12, 2012

(65) Prior Publication Data

US 2013/0182305 A1     Jul. 18, 2013

(51) Int. Cl.
*G02F 1/03* (2006.01)

(52) U.S. Cl.
USPC ............................................................ 359/245

(58) Field of Classification Search
USPC ........................................................ 359/245
See application file for complete search history.

(56) References Cited

U.S. PATENT DOCUMENTS

2007/0051939 A1 *  3/2007  Nakahara et al. ............... 257/14

* cited by examiner

*Primary Examiner* — James Jones
(74) *Attorney, Agent, or Firm* — Gavrilovich, Dodd & Lindsey, LLP

(57) ABSTRACT

An optical device includes a ridge on a base. The ridge includes an active medium. An active component on the base is a light sensor and/or a light modulator. The active component is configured to guide a light signal through the active medium included in the ridge. Electrical current carriers contact the lateral sides of the ridge on opposing sides of the ridge. Each of the electrical current carriers includes a carrier material that is doped so as to increase the electrical conductivity of the carrier material. The carrier material is different from the active medium.

18 Claims, 5 Drawing Sheets

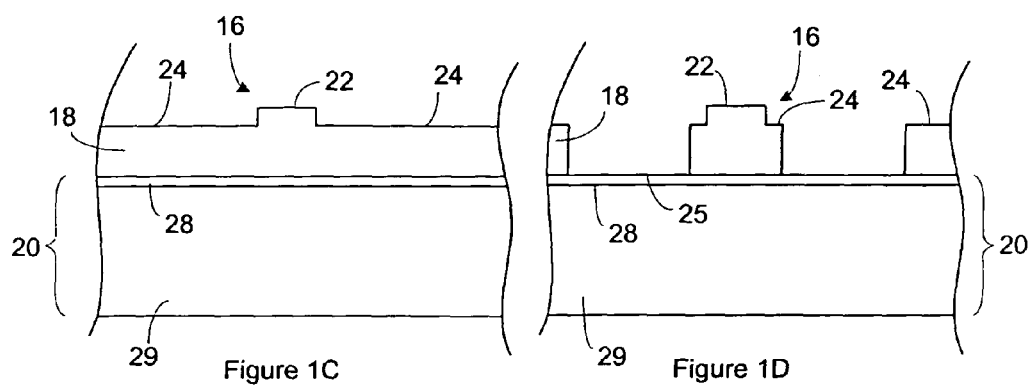
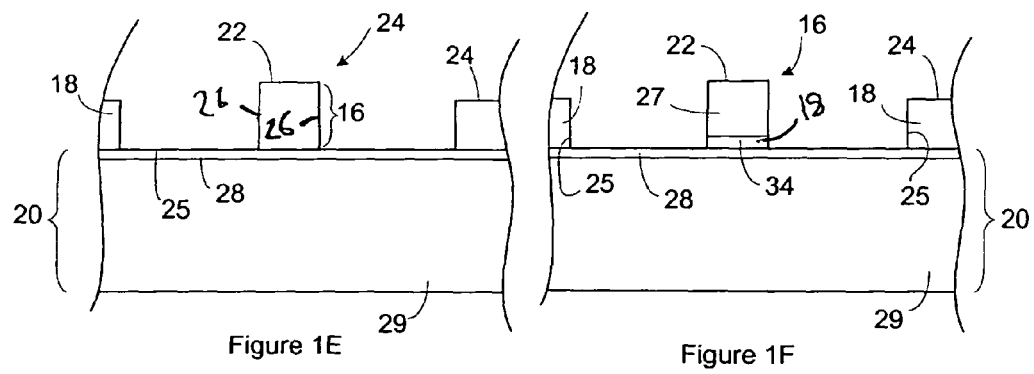

OPTICAL DEVICE HAVING REDUCED OPTICAL LEAKAGE

FIELD

The present invention relates to optical devices and more particularly to devices having optical modulators and/or light sensors.

BACKGROUND

A variety of optical devices include an active component such as a light sensor or modulator. These active components typically guide a light signal through a component waveguide while an electrical field is applied to the component waveguide. The component waveguide can be partially defined by a ridge that extends upwards from slab regions. These active components and often plagued by an undesirably high levels of optical loss. Additionally or alternately, these active components often have inconsistent performance levels that can undesirably complicate the fabrication process.

For the above reasons, there is a need for optical devices having consistent performance and/or reduced optical loss.

SUMMARY

An optical device includes a ridge having lateral sides that contact a base. The ridge includes an active medium. An active component on the base is a light sensor and/or a light modulator. The active component is configured to guide a light signal through the active medium included in the ridge. Current carriers are positioned on opposing sides of the ridge. Each current carrier is positioned on a portion of the base that is adjacent to the ridge and also extends up a lateral side of the ridge. In some instances, the current carriers are each electrically conducting and transmit light.

Another embodiment of the optical device includes a ridge on a base. The ridge includes an active medium. An active component on the base is a light sensor and/or a light modulator. The active component is configured to guide a light signal through the active medium included in the ridge. Electrical current carriers contact the lateral sides of the ridge on opposing sides of the ridge. Each of the electrical current carriers includes a carrier material that is doped so as to increase the electrical conductivity of the carrier material. The carrier material is different from the active medium.

A method of forming the device can include generating a precursor for the optical device. The precursor includes an active medium on a base. The method also includes etching the precursor so as to form a ridge having lateral sides that contact the base. The ridge includes the active medium and the etch etches through the active medium included in the ridge. The method also includes forming current carriers on opposing sides of the ridge such that each current carrier is located on a portion of the base that is adjacent to the ridge and also extends up a lateral side of the ridge. In some instances, the current carriers are each electrically conducting and transmit light.

BRIEF DESCRIPTION OF THE FIGURES

FIG. 1A through FIG. 1G illustrate an optical device having an active component configured to operate as a modulator and/or a light sensor. FIG. 1A is a perspective view of the device.

FIG. 1B is a topview of the portion of the optical device shown in FIG. 1A that includes an optical modulator.

FIG. 1C is a cross-section of the device shown in FIG. 1A taken along the line labeled C.

FIG. 1D is a cross-section of the optical device shown in FIG. 1A taken along the line labeled D.

FIG. 1E is a cross-section of the optical device shown in FIG. 1A taken along the line labeled E.

FIG. 1F is a cross-section of the optical device shown in FIG. 1A taken along the line labeled F.

FIG. 1G is a cross-section of the optical device shown in FIG. 1A taken along the line labeled J.

DESCRIPTION

An optical device includes an active component positioned on a base. The active component serves as a light modulator and/or a light sensor and is configured to guide a light signal through a ridge of an active medium. The lateral sides of the ridge extend all the way down to the base. The base can be configured such that a light signal from the active component that is incident on the base is reflected back into the active component and is accordingly not a substantial source of optical loss. Electrical energy is applied to the ridge of active medium through electrical current carriers that are each positioned on a portion of the base that is located adjacent to the ridge and that also each extends up a lateral side of the ridge. In some instances, the current carriers are each a doped material that transmits light. The doped material can have an index of refraction that is less than the index of refraction of the active medium. The reduced index of refraction reduces the amount of light that enters the current carrier and accordingly reduces interaction between the light and the dopant in the current carrier. This configuration allows the slab regions to be eliminated from the active component and accordingly reduces the optical loss associated with these slab regions.

Figure 1A:
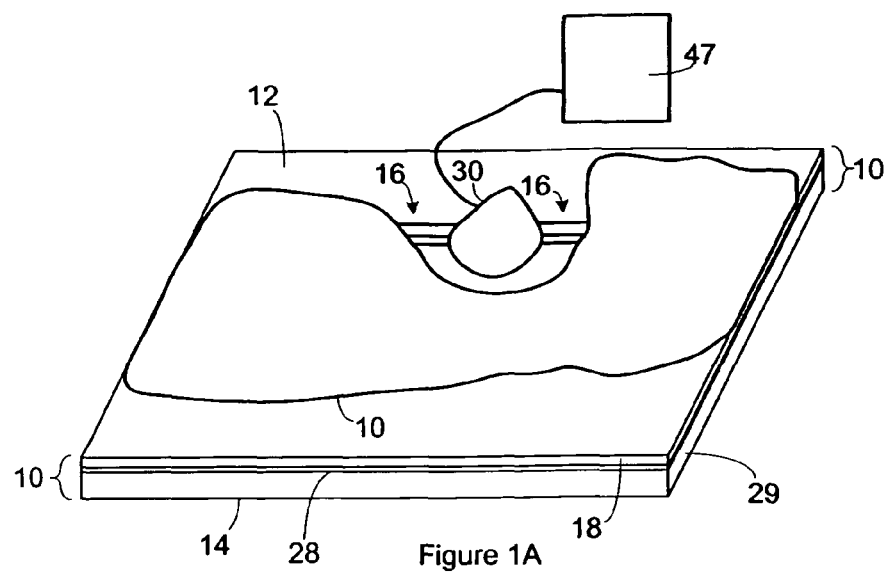
Figure 1B:
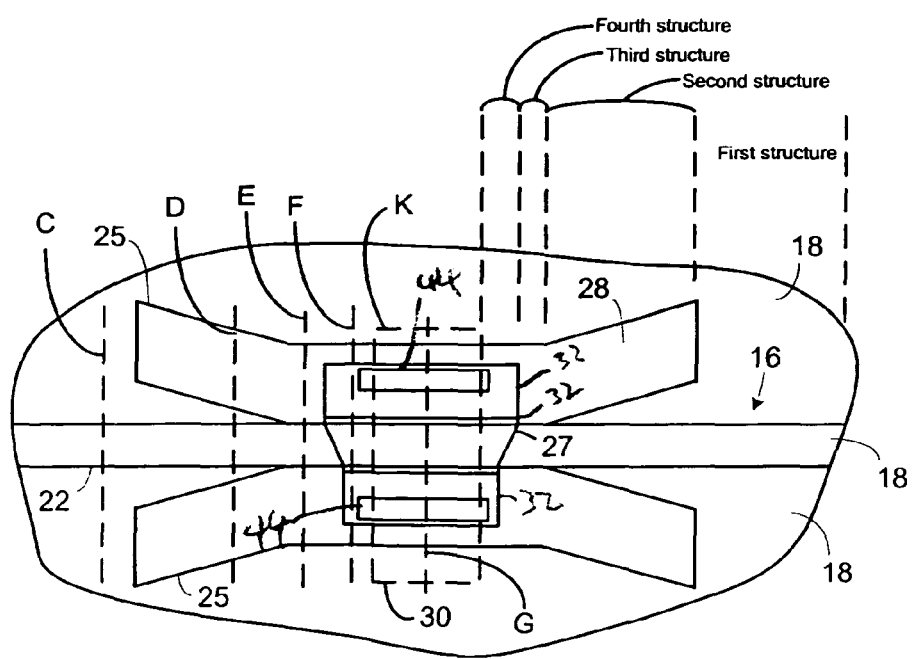
Figure 1G:
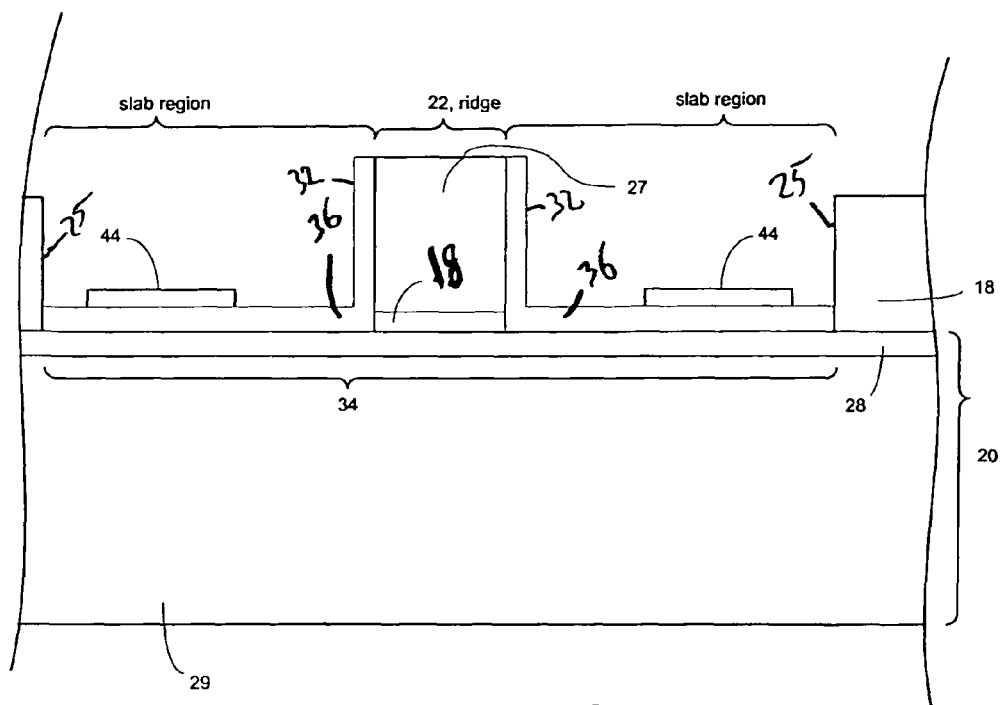

FIG. 1A through FIG. 1G illustrate an optical device having a waveguide that includes a modulator. FIG. 1A is a perspective view of the device. FIG. 1B is a topview of the portion of the optical device shown in FIG. 1A that includes an optical modulator. FIG. 1C is a cross-section of the device shown in FIG. 1A taken along the line labeled C. FIG. 1D is a cross-section of the optical device shown in FIG. 1A taken along the line labeled D. FIG. 1E is a cross-section of the optical device shown in FIG. 1A taken along the line labeled E. FIG. 1F is a cross-section of the optical device shown in FIG. 1A taken along the line labeled F. FIG. 1G is a cross-section of the optical device shown in FIG. 1A taken along the Line labeled J.

The device is within the class of optical devices known as planar optical devices. These devices typically include one or more waveguides immobilized relative to a substrate or a base. The direction of propagation of light signals along the waveguides is generally parallel to a plane of the device. Examples of the plane of the device include the top side of the base, the bottom side of the base, the top side of the substrate, and/or the bottom side of the substrate.

The illustrated device includes lateral sides 10 (or edges) extending from a top side 12 to a bottom side 14. The propagation direction of light signals along the length of the waveguides on a planar optical device generally extends through the lateral sides 10 of the device. The top side 12 and the bottom side 14 of the device are non-lateral sides.

The device includes one or more waveguides 16 that carry light signals to and/or from optical components 17. Examples of optical components 17 that can be included on the device include, but are not limited to, one or more components selected from a group consisting of facets through which light signals can enter and/or exit a waveguide, entry/exit ports through which light signals can enter and/or exit a waveguide from above or below the device, multiplexers for combining multiple light signals onto a single waveguide, demultiplexers for separating multiple light signals such that different light signals are received on different waveguides, optical couplers, optical switches, lasers that act a source of a light signal, amplifiers for amplifying the intensity of a light signal, attenuators for attenuating the intensity of a light signal, modulators for modulating a signal onto a light signal, detectors that convert a light signal to an electrical signal, and vias that provide an optical pathway for a light signal traveling through the device from the bottom side 14 of the device to the top side 12 of the device. Additionally, the device can optionally include electrical components. For instance, the device can include electrical connections for applying a potential or current to a waveguide and/or for controlling other components on the optical device.

A portion of the waveguide includes a first structure where a portion of the waveguide 16 is defined in a light-transmitting medium 18 positioned on a base 20. For instance, a portion of the waveguide 16 is partially defined by a ridge 22 extending upward from a slab region of the light-transmitting medium as shown in FIG. 1C. In some instances, the top of the slab region is defined by the bottom of trenches 24 extending partially into the light-transmitting medium 18 or through the light-transmitting medium 18. Suitable light-transmitting media include, but are not limited to, silicon, polymers, silica, SiN, GaAs, InP and LiNbO$_3$. One or more cladding layers (not shown) are optionally positioned on the light-transmitting medium. The one or more cladding layers can serve as a cladding for the waveguide 16 and/or for the device. When the light-transmitting medium 18 is silicon, suitable cladding layers include, but are not limited to, polymers, silica, SiN, GaAs, InP and LiNbO$_3$.

Recesses 25 (FIG. 1B) extend into the light-transmitting medium 18 such that the ridge 22 is positioned between recesses 25. As is evident from FIG. 1D, the recesses 25 can be spaced apart from the ridge 22. As a result, a portion of the waveguide 16 includes a second structure where an upper portion of the waveguide 16 is partially defined by the ridge 22 extending upward from the slab region and a lower portion of the waveguide is partially defined by recesses 25 extending into the slab regions and spaced apart from the ridge.

As shown in FIG. 1E, the recesses 25 can approach the ridge 22 such that the sides of the ridge 22 and the sides of the recesses 25 combine into a single lateral surface 26. As a result, a portion of a waveguide includes a third structure where the waveguide is partially defined by the surface 26.

As is evident in FIG. 1B, a portion of the waveguide includes an active medium 27 such as an electro-absorption medium. The active medium 27 is configured to receive the light signals from a portion of the waveguide having the third structure and to guide the received light signals to another portion of the waveguide having the third structure.

In FIG. 1F, the ridge 22 includes the active medium 27 and the light-transmitting medium 18 with the light-transmitting medium 18 being between the active medium 27 and the base 20. In the illustrated embodiment, the light-transmitting medium 18 does not extend substantially beyond the lateral sides of the active medium 27. Accordingly, the lateral sides of the ridge 22 extend down to and contact the base. In the illustrated embodiment, the lateral sides of the ridge are straight all the way from the base to the top of the ridge although other structures are possible. Accordingly, a portion of a waveguide includes a fourth structure where the waveguide is partially defined by the top and lateral sides of the active medium 27. In some instances, when the light signal travels from the light-transmitting medium into the active medium 27, a portion of the light signal enters the seed portion 34 of the light-transmitting medium 18 and another portion of the light signal enters the active medium 27. As described above, the active medium 27 can be grown on the seed portion of the light-transmitting medium 18.

As is evident in FIG. 1B, there is an interface between each facet of the active medium 27 and a facet of the light-transmitting medium 18. The interface can have an angle that is non-perpendicular relative to the direction of propagation of light signals through the waveguide 16 at the interface. In some instances, the interface is substantially perpendicular relative to the base 20 while being non-perpendicular relative to the direction of propagation. The non-perpendicularity of the interface reduces the effects of back reflection. Suitable angles for the interface relative to the direction of propagation include but are not limited to, angles between 80° and 89°, and angles between 80° and 85°.

The portion of the base 20 adjacent to the light-transmitting medium 18 is configured to reflect light signals from the waveguide 16 back into the waveguide 16 in order to constrain light signals in the waveguide 16. For instance, the portion of the base 20 adjacent to the light-transmitting medium 18 and/or the active medium 27 can be an optical insulator 28 with a lower index of refraction than the light-transmitting medium 18. The drop in the index of refraction can cause reflection of a light signal from the light-transmitting medium 18 back into the light-transmitting medium 18. The base 20 can include the optical insulator 28 positioned on a substrate 29. The substrate 29 can be made of a material that transmits light signals. For instance, the substrate 29 can be constructed of a light-transmitting medium 18 that is different from the light-transmitting medium 18 or the same as the light-transmitting medium 18. In one example, the device is constructed on a silicon-on-insulator wafer. A silicon-on-insulator wafer includes a silicon layer that serves as the light-transmitting medium 18. The silicon-on-insulator wafer also includes a layer of silica positioned on a silicon substrate. The layer of silica can serving as the optical insulator 28 and the silicon substrate can serve as the substrate 29.

The optical device includes an active component 30 such as a modulator or light sensor. The location of the modulator on the optical device can be illustrated by the line labeled K in FIG. 1B. In order to simplify FIG. 1B, the details of the modulator construction are not shown in FIG. 1B. However, the modulator construction is evident from other illustrations such as FIG. 1G. The modulator of FIG. 1G is constructed on the portion of the waveguide having a fourth structure constructed according to FIG. 1F. The modulator is configured to apply an electric field to the active medium 27 in order to phase and/or intensity modulate the light signals received by the modulator.

The modulator includes electrical current carriers 32. Current carriers 32 are each positioned on a portion of the base that is adjacent to the ridge and also extend at least part way up a side of the ridge. The current carriers 32 each contacts a lateral side of the seed portion 34 of the light-transmitting medium 18 located between the base and the ridge of the active medium. Additionally, each of the current carriers 32 is shown contacting the base. In particular, each of the current carriers 32 is shown contacting the optical insulator 28. The transition of a current carrier 32 from the ridge 22 of the active medium 27 onto a slab region of the active medium 27 can be continuous and unbroken as shown in FIG. 1G.

As is evident from FIG. 1G, the current carriers 32 can extend from one of the slab regions and into contact with the ridge before extending up a lateral side of the ridge. The height of the portion of the current carriers 32 extending up the lateral side of the ridge can be greater than the thickness of the portion of the current carrier located on the base. As a result, a portion of each current carrier can be located above the portion of the current carrier located on the base. In this arrangement, the top of the portion of the current carrier over the base moves toward the ridge turns or bends upward as a result of the current carrier extending up the lateral side of the ridge. The current carriers 32 preferable extend up more than 50%, 75%, or 90% of the height of the ridge 22.

The portion of the current carriers located on the base can extend further away from the ridge than the thickness of the portion of the current carrier extending up the side of the ridge. In this arrangement, the top of the portion of the current carrier on the ridge moves toward the base and then turns or bends away from the ridge as a result of the current carrier extending away from the ridge. The current carriers can extend more than 5 µm, 10 µm, or 15 µm away from the ridge 22.

A suitable current carrier 32 includes electrically conducting materials such as metals that form a Schottky barrier at the interface of the current carrier 32 and the active medium 27. However, many of these materials absorb light at undesirably high levels. Another alternative for the current carrier 32 is electrically conducting materials that are transmit light at the operational wavelengths but form neither a Schottky barrier at the interface of the current carrier 32 and the active medium 27 nor a depletion region within the active medium during the application of a reverse bias. In these instances, the index of refraction for the current carrier 32 is preferably less than the index of refraction of the active medium in order to reduce or prevent entry of light into the current carrier 32 from the active medium. Examples of these materials may include conducting polymers such as poly(3,4-ethylenedioxythiophene): poly(styrene sulfonate) (PEDOT: PSS). Operation of the active component without a Schottky barrier(s) or depletion region is likely to be undesirably slow.

In another option, a carrier material that transmits light and is doped serves as one or more of the current carriers 32. In these instances, the index of refraction for the current carrier 32 can be less than the index of refraction of the active medium in order to reduce or prevent entry of light into the current carrier 32 from the active medium. In some instances, the index of refraction of the current carrier 32 is also less than the index of refraction of the light-transmitting medium in order to reduce or prevent entry of light into the current carrier 32 from the active medium. When the active medium 27 is germanium or $Ge_{1-x}Si_x$ (germanium-silicon) where x is greater than or equal to zero, an example of a suitable carrier material includes, but is not limited to, polysilicon, amorphous silicon, and indium tin oxide.

The doping of the material of the current carrier 32 can make the carrier material electrically conducting and/or increase the electrical current carrying capability of the carrier material. As shown in FIG. 1G, the entire carrier material can be doped and can accordingly serve as the current carrier. Alternately, a portion of the carrier material can be doped. Since the doping can increase the electrical conductivity of the carrier medium, each doping region can extend from contacting one of the electrical conductors 44 into contact with the ridge of the active medium 27.

As will be described below, the carrier material can be doped such that a depletion region forms in the active medium 27 upon application of a reverse bias to the active component. The depletion region can increase the response time of the active component. Accordingly, moving the doped regions 36 of one or more current carriers 32 closer to the ridge of the active medium 27 can increase the size of the depletion region. In some instances, the carrier material is doped such that one or more of the doped regions 36 each contacts the ridge of the active medium 27.

Each of the doped regions 36 can be an N-type doped region or a P-type doped region. For instance, each of the N-type doped regions can include an N-type dopant and each of the P-type doped regions can include a P-type dopant. In some instances, a current carrier 32 includes a doped region 36 that is an N-type doped region and on the opposing side of the ridge is another current carrier 32 that includes a doped region 36 that is a P-type doped region. In this instance, the active medium separates the doped regions 36 so as to form a P-I-N (p-type region-intrinsic region-n-type region) junction in the active component. Accordingly, under reverse bias, the intrinsic region (the active medium 27) can be depleted of carriers (form a depletion region) and accordingly build up a field that quickly sweeps the carriers out of the intrinsic region. This configuration increases the response speed of the active component.

Suitable dopants for N-type regions include, but are not limited to, phosphorus and/or arsenic. Suitable dopants for P-type regions include, but are not limited to, boron. A suitable concentration for the P-type dopant in a P-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$. A suitable concentration for the N-type dopant in an N-type doped region includes, but is not limited to, concentrations greater than $1\times10^{15}$ cm$^{-3}$, $1\times10^{17}$ cm$^{-3}$, or $1\times10^{19}$ cm$^{-3}$, and/or less than $1\times10^{17}$ cm$^{-3}$, $1\times10^{19}$ cm$^{-3}$, or $1\times10^{21}$ cm$^{-3}$.

Electrical conductors 44 are positioned on the current carriers 32. When the current carriers 32 include doped regions 36 for carrying electrical energy, the doped regions 36 preferably extend from the electrical conductor to the active medium in the ridge. For instance, FIG. 1G shows the electrical conductors 44 each contacting a portion of a doped region 36 that is included in a current carrier 32 and the contacted doped region 36 extends into contact with the active medium 27 in the ridge 22. Accordingly, each of the current carriers 32 can provide electrical communication between an electrical conductor 44 and the active medium 27 in the ridge. As a result, electrical energy can be applied to the electrical conductors 44 in order to apply the electric field to the active medium 27.

The region of the light-transmitting medium or active medium between the doped regions 36 can be undoped or lightly doped as long as the doping is insufficient for the doped material to act as an electrical conductor that electrically shorts the active component.

During operation of the modulators of FIG. 1A through FIG. 1G, electronics 47 (FIG. 1A) can be employed to apply electrical energy to the electrical conductors 44 so as to form an electrical field in the active medium 27. The electrical field can be formed without generating a significant electrical current through the active medium 27. The active medium 27 can be a medium in which the Franz-Keldysh effect occurs in response to the application of the electrical field. The Franz-Keldysh effect is a change in optical absorption and optical phase by an active medium 27. For instance, the Franz-Keldysh effect allows an electron in a valence band to be excited into a conduction band by absorbing a photon even though the energy of the photon is below the band gap. To utilize the Franz-Keldysh effect the active region can have a slightly larger bandgap energy than the photon energy of the light to be modulated. The application of the field lowers the absorption edge via the Franz-Keldysh effect and makes absorption possible. The hole and electron carrier wavefunctions overlap once the field is applied and thus generation of an electron-hole pair is made possible. As a result, the active medium 27 can absorb light signals received by the active medium 27 and increasing the electrical field increases the amount of light absorbed by the active medium 27. Accordingly, the electronics can tune the electrical field so as to tune the amount of light absorbed by the active medium 27. As a result, the electronics can intensity modulate the electrical field in order to modulate the light signal. Additionally, the electrical field needed to take advantage of the Franz-Keldysh effect generally does not involve generation of free carriers by the electric field.

Suitable active media 27 for use in the modulator include electro-absorption media 27 such as semiconductors. However, the light absorption characteristics of different semiconductors are different. A suitable semiconductor for use with modulators employed in communications applications includes $Ge_{1-x}Si_x$ (germanium-silicon) where x is greater than or equal to zero. In some instances, x is less than 0.05, or 0.01. Changing the variable x can shift the range of wavelengths at which modulation is most efficient. For instance, when x is zero, the modulator is suitable for a range of 1610-1640 nm. Increasing the value of x can shift the range of wavelengths to lower values. For instance, an x of about 0.005 to 0.01 is suitable for modulating in the c-band (1530-1565 nm).

The structure illustrated in FIG. 1G can also be employed as a light sensor. For instance, the active medium 27 can be a light-absorbing medium such as germanium. Accordingly, the number 27 in FIG. 1A through FIG. 1G can represent a light-absorbing medium. During operation of the light sensor, a reverse bias electrical field is applied across the active medium 27. When the active medium 27 absorbs a light signal, an electrical current flows through the active medium 27. As a result, an electrical current through the light-absorbing medium indicates receipt of a light signal. Additionally, the magnitude of the current can indicate the power and/or intensity of the light signal. The active component can also be operated as a light sensor without applying a bias although slower response times generally result.

Different active media 27 can absorb different wavelengths and are accordingly suitable for use in a light sensor depending on the function of the light sensor. A light-absorbing medium that is suitable for detection of light signals used in communications applications includes, but are not limited to, germanium, silicon germanium, silicon germanium quantum well, GaAs, and InP. Germanium is suitable for detection of light signals having wavelengths in a range of 1300 nm to 1600 nm. In some instance, the electronics can be configured to operate a structure as shown in FIG. 1G as both a modulator and a light detector.

Modulators and/or light sensors having a cross section according to 1G can be used in configurations other than the configuration of FIG. 1A through 1F. Additional details about the fabrication, structure and operation of a modulator having a cross section according to FIG. 1G can be found in U.S. patent application Ser. No. 12/653,547, filed on Dec. 15, 2009, entitled "Optical Device Having Modulator Employing Horizontal Electrical Field," and incorporated herein in its entirety. Additional details about the fabrication, structure and operation of a light sensor having a cross section according to FIG. 1G can be found in U.S. Patent Application No. 61/572,841, filed on Jul. 21, 2011, entitled "Optical Device Having Light Sensor with Doped Regions;" and also in U.S. patent application Ser. No. 13/136,828, filed on Aug. 10, 2011, entitled "Application of Electrical Field Power to Light-Transmitting Medium," each of which is incorporated herein in its entirety, An optical component having a cross section according to FIG. 1G can be constructed using fabrication technologies that are employed in the fabrication of integrated circuits, optoelectronic circuits, and/or optical devices. FIG. 2A through FIG. 2E illustrate a method of forming an active component having a cross section as shown in FIG. 1G. The method is illustrated using a silicon-on-insulator wafer or chip as the starting precursor for the optical device. However, the method can be adapted to platforms other than the silicon-on-insulator platform.

Figure 2A:
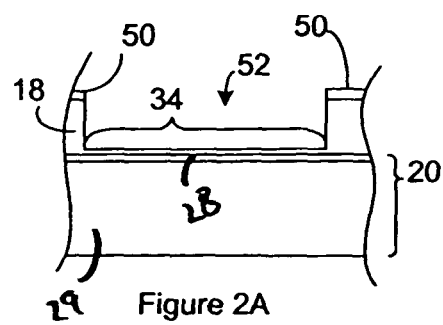
FIG. 2A through FIG. 2E illustrate a method of forming an active component having a cross section as shown in FIG. 1G.

FIG. 2A illustrate a first mask 50 formed on a silicon-on-insulator wafer or chip to provide a device precursor. FIG. 2A is a cross-section of the device precursor. The first mask 50 leaves exposed a region of the device precursor where an active cavity 52 is to be formed while the remainder of the illustrated portion of the device precursor is protected. The active cavity 52 is the region of the device precursor where the electro-absorption medium will be formed. A first etch is then performed so as to form the active cavity 52. The first etch yields the device precursor of FIG. 2A. The first etch is performed such that a seed portion 34 of the light-transmitting medium 18 remains on the base 20. Accordingly, the first etch is terminated before the base 20 is reached.

A suitable first mask 50 includes, but is not limited to, a hard mask such as a silica mask. A suitable first etch includes, but is not limited to, a dry etch.

Figure 2B:
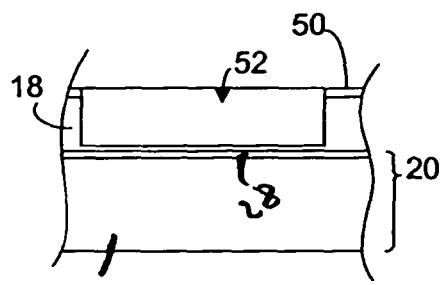

The active medium 27 is formed in the active cavity 52 of FIG. 2A so as to provide the device precursor of FIG. 2B. When the light-transmitting medium 18 is silicon and the active medium 27 is germanium or germanium-silicon, the active absorption medium 27 can be grown on the seed portion 34 of the light-transmitting medium.

After formation of the active medium 27, the first mask 50 can be removed and the device precursor can be planarized. Suitable planarization methods include, but are not limited to, a chemical-mechanical polishing (CMP) process.

Figure 2C:
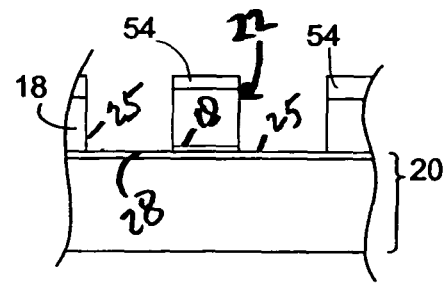

A second mask 54 is formed on the device precursor as shown on the device precursor of FIG. 2C. The second mask 54 is formed such that the regions where the recesses that define the ridge are to be formed are exposed while the remainder of the active medium 27 and light-transmitting medium 18 are protected. Accordingly, the second mask 54 protects the located where the ridge will be formed. A suitable second mask 54 includes a hard mask such as a silica mask. A second etch is performed so as to form the ridge in the active medium as shown in the device precursor of FIG. 2C. The second etch can etch all of the way to the base. For instance, the second etch can be performed until there is no active medium 27 or light-transmitting medium 18 next to the ridge. As a result, the underlying base defines the bottom of the recesses formed by the second etch. For instance, the optical insulator 28 can define the bottoms of the recesses formed by the second etch. A suitable second etch includes, but is not limited to, a dry etch.

Although FIG. 2C shows the top of the base defining the bottom of the recesses, the second etch can be an intentional over-etch. For instance, the second etch can be performed for a duration where the top of the base is etched. As a result, the recesses can extend into the base. For instance, the recesses can extend into the optical insulator 28.

Figure 2D:
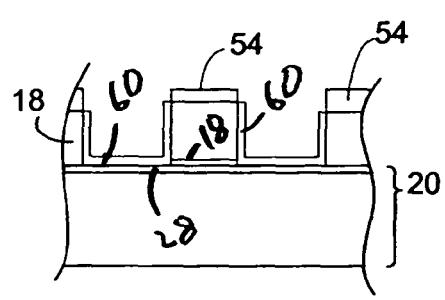

The material 60 for the current carriers is formed on the exposed regions of the device precursor to provide a device precursor of FIG. 2D. A suitable method of forming the material 60 for the current carriers includes, but is not limited to, chemical vapor deposition (CVD), plasma-enhanced chemical vapor deposition (PECVD), and pyrolyzing silane.

Figure 2E:
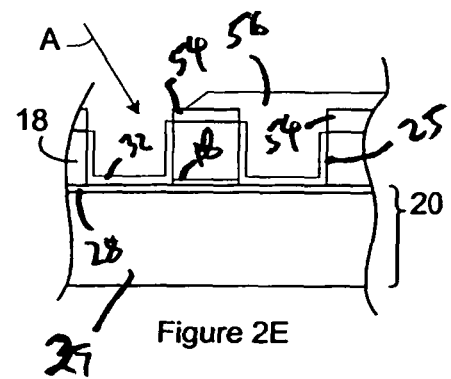

The n-type doped region and the p-type doped region are serially formed in the material 60 for the current carrier. For instance, a third mask 56 can be formed so as to protect the material in one of the recesses as is shown in FIG. 2E. One of the doped regions 36 is formed in the recess as shown by the arrow labeled A. Suitable methods of forming the doped region 36 include, but are not limited to, dopant implantation or dopant addition during the deposition process. As evident from the arrow labeled A, the direction of the dopant implantation can be such that the doping occurs both in the material extending up the ridge and the material on the base.

The third mask 56 can be removed and a fourth mask used to dope the material in the remaining recess. The second mask 54 can then be removed and electrical conductors 44 added to provide the active component of FIG. 1G.

Figure 3:
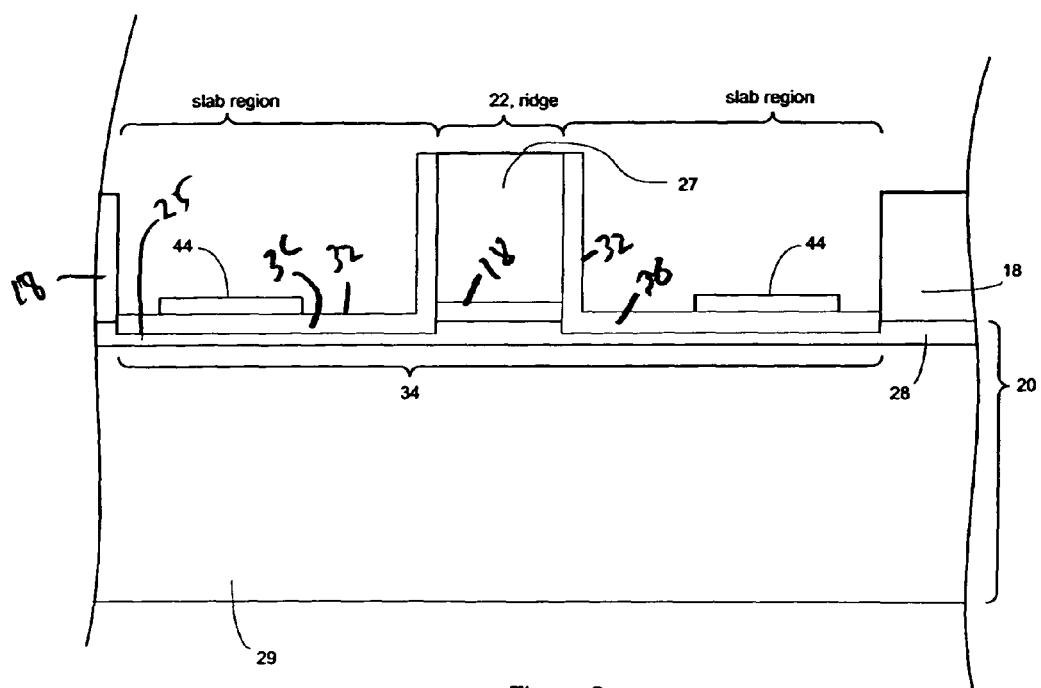
FIG. 3 is a cross section of an active component according to FIG. 1G but with recesses extending part way into an optical insulator.

As noted above, in some instances, the second etch is an intentional over-etch that provides recesses extending into the base. FIG. 3 is a cross section of an active component according to FIG. 1G but with the recesses extending part way into the optical insulator 28.

Although the active component is disclosed above as having at least two current carriers on opposing sides of a ridge where the current carriers have similar structures with the exception of dopant type, the current carriers on opposing sides of a ridge can have different structures. Accordingly, an active component can have only one current carriers as disclosed above. For instance, an active component can have a current carriers constructed as disclosed above and a second current carrier located on the opposite side of the ridge and that uses a different structure and/or method of construction. Rather than being a material with a doped region, a more conventional electrical conductor such as a wire or metal trace can replace the second current carriers. As a result, the active component can include a single doped region.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

The invention claimed is:

1. An optical device, comprising:
a ridge on a base, the ridge including an active medium,
an active component on the base and having at least one functionality selected from a group consisting of light sensor functionality and light modulator functionality, the active component configured to guide a light signal through the active medium included in the ridge, electrical current carriers contacting opposing sides of the ridge, each of the electrical current carriers including a carrier material that is doped so as to increase the electrical conductivity of the carrier material, the carrier material being different from the active medium.

2. The device of claim 1, wherein each current carrier being positioned on a portion of the base that is adjacent to the ridge and bends such that the current carrier also extends up a lateral side of the ridge.

3. The device of claim 2, wherein lateral sides of the ridge contacts the base.

4. The device of claim 1, wherein the current carriers each transmit light.

5. The device of claim 4, wherein an index of refraction of each current carrier is less than an index of refraction of the active medium.

6. The device of claim 1, wherein a first one of the current carriers includes an n-type doped region and a second one of the current carriers includes a p-type doped region.

7. The device of claim 6, wherein the doped regions each extends from an electrical conductor to a lateral side of the ridge.

8. The device of claim 1, wherein a light-transmitting medium is between the base and the active medium.

9. The device of claim 8, further comprising:
a waveguide on the base, the waveguide being configured to guide the light signal through the light-transmitting medium.

10. The device of claim 9, wherein the portion of the light-transmitting medium through which the waveguide is configured to guide the light signal is continuous with the portion of the light-transmitting medium between the base and the active medium.

11. The device of claim 9, wherein the base is configured to reflect a light signal from the light-transmitting medium back into the light-transmitting medium.

12. The device of claim 1, wherein a portion of the base contacting the lateral sides of the ridge includes silica.

13. The device of claim 1, wherein the active medium includes at least one component selected from a group consisting of germanium and $Ge_{1-x}Si_x$ where x is greater than or equal to zero.

14. A method forming an optical device, comprising:
generating a precursor for the optical device, the precursor including an active medium on a base;
performing an etch of the precursor so as to form a ridge having lateral sides that contact the base,
the ridge including the active medium, and
the etch etching through the active medium; and
forming current carriers on opposing sides of the ridge such that the current carriers each contacts the ridge,
each of the current carriers including a carrier material that is doped so as to increase the electrical conductivity of the carrier material,
the carrier material being different from the active medium.

15. The method of claim 14, wherein forming the current carriers includes doping at least a portion of the carrier material.

16. The method of claim 14, wherein a first one of the current carriers includes an n-type doped region and a second one of the current carriers includes a p-type doped region.

17. The method of claim 16, wherein the n-type doped region is on an opposing side of the ridge from the p-type doped region.

18. The method of claim 16, wherein the doped regions each extends from an electrical conductor to the ridge.

* * * * *